United States Patent
Montgomery et al.

(10) Patent No.: US 6,380,950 B1
(45) Date of Patent: Apr. 30, 2002

(54) LOW BANDWIDTH TELEVISION

(75) Inventors: Joseph Paul Montgomery, Granite Bay; Michael Richard Young Moore, Rancho Cordova; Stephen A. Hartford; Mark R. Mooneyham, both of Folsom; Daniel A. Kaye, San Francisco; Kenneth A. Turcotte, Folsom; Steven R. Kell, El Dorado Hills; Stephan D. Schaem, Citrus Heights, all of CA (US)

(73) Assignee: GlobalStreams, Inc., Emeryville, CA (US)

( * ) Notice: Subject to any disclaimer, the term of this patent is extended or adjusted under 35 U.S.C. 154(b) by 0 days.

(21) Appl. No.: 09/233,687

(22) Filed: Jan. 19, 1999

Related U.S. Application Data

(60) Provisional application No. 60/071,930, filed on Jan. 20, 1998.

(51) Int. Cl.[7] .................................................. G06F 3/00
(52) U.S. Cl. ........................ 345/723; 345/719; 345/716; 707/500.1
(58) Field of Search ................................ 345/326, 325, 345/327, 328, 329, 302, 723, 716, 719; 709/203, 219; 386/52, 55, 53, 64; 348/571, 576, 575, 584, 578; 707/500.1

(56) References Cited

U.S. PATENT DOCUMENTS

| | | | | |
|---|---|---|---|---|
| 5,130,794 A | * | 7/1992 | Ritchey ........................ 348/39 |
| 5,630,017 A | * | 5/1997 | Gasper et al. ............... 704/276 |
| 5,832,100 A | * | 11/1998 | Lawton ....................... 382/100 |
| 5,982,364 A | * | 11/1999 | Beckwith .................... 345/328 |
| 6,172,672 B1 | * | 1/2001 | Ramasubramanian ....... 345/327 |

OTHER PUBLICATIONS

White, Charlie, "Squeeze Play—Video Compression Formats Explained", DV Magazine, vol. 5 No. 2, Feb. 1997, pp. 1–6. http://www.dv.com.

* cited by examiner

*Primary Examiner*—John Cabeca
*Assistant Examiner*—Kieu D. Vu
(74) *Attorney, Agent, or Firm*—Carr & Ferrell LLP

(57) ABSTRACT

The present invention is concerned with client-side production in a personal computer environment of low bandwidth images and audio. A series of low bandwidth still images along with a "script" and audio data is sent over a network in a client/server architecture or is read from a compact disk or other memory. A "director" module residing in a client personal computer uses the "script" to tell the computer how to execute a sequence of "moves" on the still images. These moves include cuts, dissolves, fades, wipes, focuses, flying planes and digital video effects such as push and pull. Moves within a still image occur in real time, and are relatively smooth and continuous as compared to prior art network video. Low bandwidth is achieved because most of the production is done at the client location without relying upon slow, bandwidth-limited downloading of conventional network video formats.

27 Claims, 7 Drawing Sheets

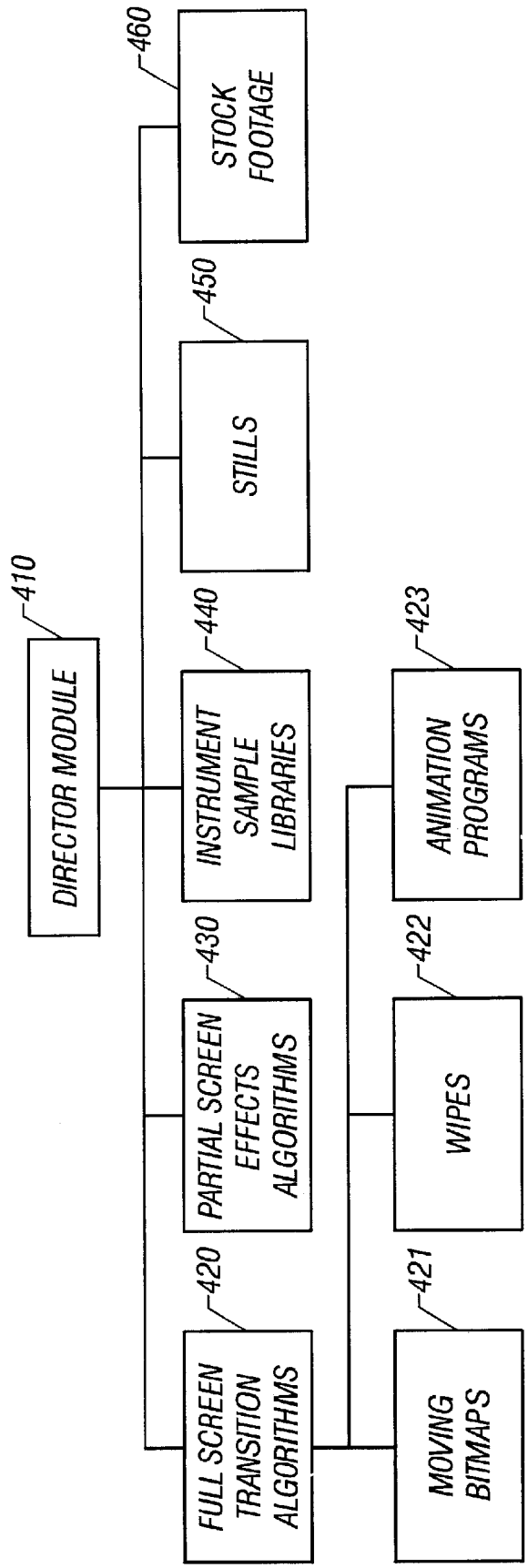

LOW BANDWIDTH TELEVISION

CROSS-REFERENCE TO RELATED APPLICATION

This application claims the benefit of U.S. Provisional Application No. 60/071,930, filed on Jan. 20, 1998 and entitled "LOW BANDWIDTH TELEVISION".

BACKGROUND OF THE INVENTION

1. Field of the Invention

The present invention relates generally to image processing, and specifically to production of images and audio in a personal computer environment.

2. Discussion of the Prior Art

An important issue in digital technology is providing video images on a personal computer. These images are transmitted across the Internet and other networks, across telephone lines with modem-to-to modem connections, or received from compact disk read-only memories (CD-ROMs). The speed of a modem is commonly the limiting factor in sending real time, continuous video information across the Internet, over corporate intranets or local area networks. In comparison, continuous network transmission of audio data does not present significant difficulties.

Table 1 shows theoretical bandwidth maxima for various network architectures. Modem-to-modem connections across lines in plain old telephone service (POTS) have a theoretical bandwidth of 3,360 bytes per second, while connections across the Internet with a modem or single ISDN are limited to 5,600 bytes per second. Dual ISDN network architectures transmit a maximum of 11,200 bytes per second, while corporate local area networks with 10 BaseT connections have a capability of transmitting one megabyte per second. With the exception of telephone line connections, these other techniques involve non-continuous, packet-switched data. Satellite and cable architectures are also possible, but have not yet been widely adopted and present other difficulties.

TABLE 1

| Network Architecture | Theoretical Maximum Bandwidth | Continuous Bandwidth |
| --- | --- | --- |
| Modem to modem over POTS | 3,360 bytes/sec | Yes |
| Internet with modem | 5,600 bytes/sec | No |
| Internet with single ISDN | 5,600 bytes/sec | No |
| Internet with dual ISDN | 11,200 bytes/sec | No |
| Corporate 10BaseT | One megabyte/sec | No |

On the other hand, computer memories and processor speeds have made rapid advances. Personal computers have hard drives accommodating many gigabits of data, and the price of memory chips is decreasing. Processor speeds approaching 300 MHz are available, and speeds of several GHz are contemplated.

To view a still or motion picture from the Internet on a personal computer, a user conventionally downloads video data from a web site by clicking on a web link. Often, however, it is necessary to separately download (or otherwise obtain) software, e.g. Adobe Acrobat, in order to display a particular image format. Images are frequently compressed for transmission over networks or storage on disks. Compression algorithms, such as JPEG and MPEG, using discrete cosine transfer (DCT) methods, produce serviceable images but compromise image size, image quality, definition, and acquisition speed. Image latency is also sacrificed. A user must wait while an entire image or series of images is buffered in a client side personal computer prior to display. Image transmission is sometimes interrupted due to network errors and traffic. Streaming techniques allow a user to begin viewing the images immediately while downloading, but streaming still sacrifices image quality and latency.

Currently, International Telecommunications Union Standard ITU-R 601 for digital formats in professional video production (i.e. NTSC) requires 720 by 486 pixels per frame in the scanned image, and an eight-bit 4:2:2 sampling of Y, R-Y, B-Y color components at sixty frames per second. This results in a data stream of 20 megabytes per second if the format is to remain uncompressed and if the images are to be viewed continuously in real time. Clearly, this is greater than the fastest rate for 10 BaseT of one megabyte per second. A compression ratio of 5:1 is the most that is considered desirable for production marketplace image quality, but this only reduces the necessary data rate to 4 megabytes per second. Using 4:1:1 sampling, other conventional digital video production techniques (e.g. DVC Pro and DV Cam) produce a marginally improved data rate of 3 megabytes per second. Compression ratios of 30:1 are sometimes used for previewing and editing of video images, but this only yields a data rate of 700 kilobytes per second. Data rates for these formats are summarized in Table 2.

TABLE 2

| Digital Video Format | Compression Ratio | Data Rate |
| --- | --- | --- |
| ITU-R 601 | 1:1 (uncompressed) | 20 megabytes/sec |
| ITU-R 601 | 5:1 | 4 megabytes/sec |
| DV (DVC Pro & DV Cam) | 5:1 (using 4:1:1 sampling) | 3 megabytes/sec |
| ITU-R 601 | 30:1 (offline quality) | 700 kilobytes/sec |

Comparing this to the standard modem of 56 kilobytes per second, there is a readily apparent, significant gap between requirements for ITU-R 601 and present-day hardware transmission capabilities. A further compression ratio of 125:1 on an already-compressed and marginally acceptable 30:1 compressed image, i.e. a total compression of 750:1, is needed to transmit ITU-R 601 data across a 56 k modem.

Present methods of displaying moving objects on web pages involve either bit-mapped or vector approaches. Simple moving icons on a web page are produced by changing only part of the image in every frame. For example, Microsoft® and Netscape® browsers show moving traces around their logos while a processor is retrieving a page. Advertisements on web pages also display moving images. The bandwidth for these images is reduced by making the images smaller so that fewer bits are needed for each frame, or by slowing down the frame rate so that the images appear to move discontinuously.

High definition television (HDTV) attempts to simplify the display of video images and reduce bandwidth by recognizing constant areas within a video picture and retaining much of the information from a previous frame. While HDTV developed concurrently with MPEG and JPEG, HDTV is broadcast-oriented and does not lend itself to network transmission or personal computer applications.

It is expected that bandwidth will continue to be the bottleneck in network transmission for the foreseeable future. Thus, there is an outstanding need in the prior art to be able to send professional quality video images across networks through ordinary modems by taking advantage of plenary memory and processor capacities within personal computers, and thereby reducing reliance on transmission hardware. There is also a need to create compelling new video experiences in personal computers.

SUMMARY OF THE INVENTION

The present invention is concerned with client-side production in a personal computer environment of low bandwidth images and audio. A series of still images in an image module along with a "script" module and an audio module are sent over a network in a client/server architecture or are read from a compact disk or other memory. A "director" module residing in memory (e.g. on hard disk) of the client personal computer uses the "script" to tell the computer how to execute a sequence of "moves" on the still images. These moves include, but are not limited to, cuts, dissolves, fades, wipes, focuses, flying image planes, and digital video effects such as push and pull. The director module is either downloaded from a network on a one-time basis or uploaded from a floppy or compact disk.

Production sequences are in real time, as well as being relatively smooth and continuous as compared to prior art network video. In order to permit viewing as soon as possible and to avoid caching, the script module is transmitted to the personal computer along with preliminary images, so playback begins immediately. Low bandwidth is achieved because a majority of the production is done at the client location and the transmission of still pictures, audio data and script is relatively rapid. Images are always displayed in real time and in full screen formats. If necessary to prevent latency delays, the director modules inserts stand-in from stock footage, animation and loops so that a viewer always has a continuous visual and audio experience.

BRIEF DESCRIPTION OF THE DRAWINGS

For a more complete understanding of the invention, as well as other features thereof, reference may be had to the following detailed description of the invention in conjunction with the drawings wherein.

DETAILED DESCRIPTION OF THE PREFERRED EMBODIMENTS

Figure 1:
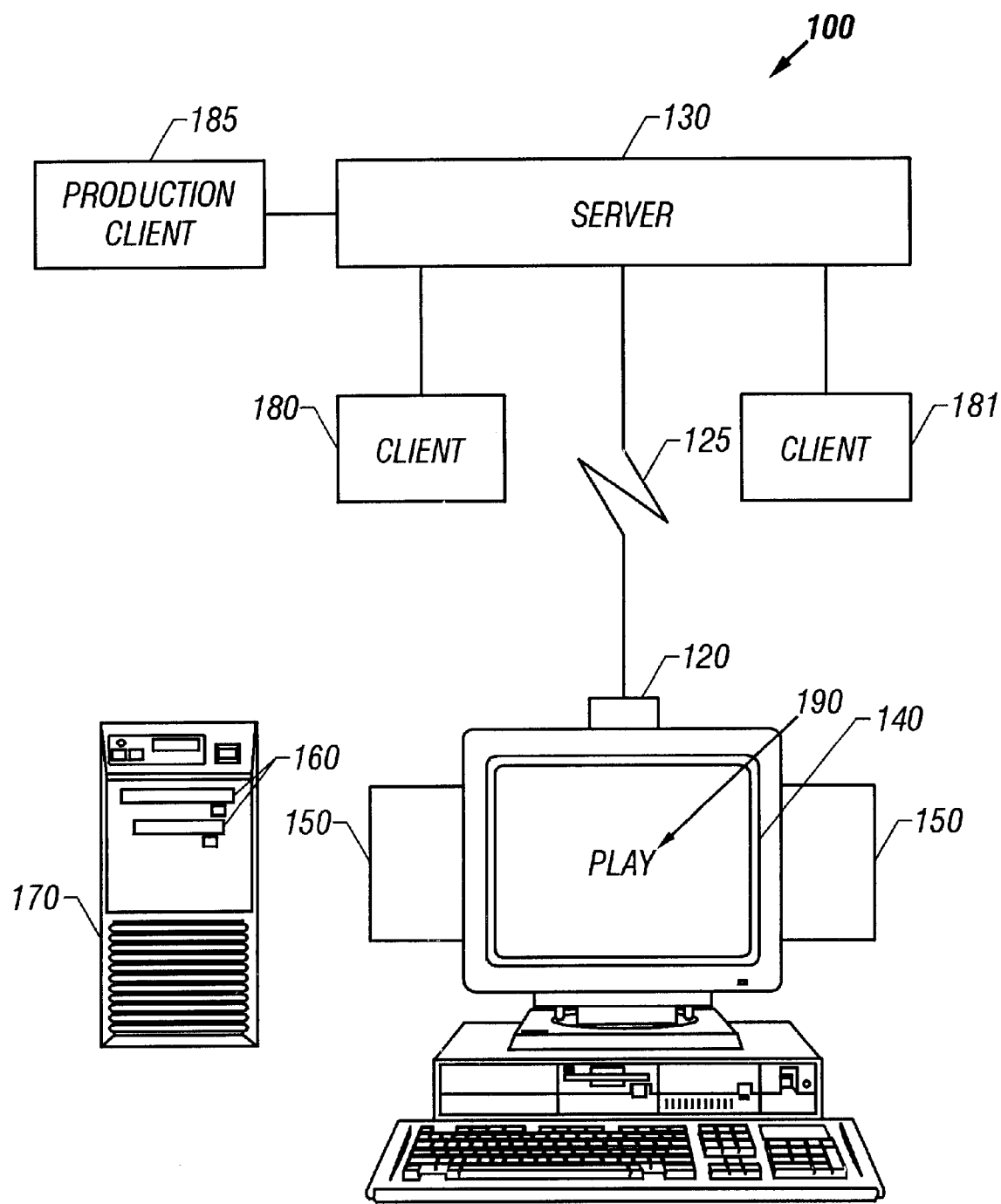
FIG. 1 illustrates a network architecture of the present invention.

FIG. 1 shows a general overview of a client/server architecture of the present invention. Client personal computer 100 is connected through modem 120 and network 125 to server 130. Computer 100 includes display screen 140, stereo speakers 150, disk drives 160, and hard drive 170 containing a number of software modules. Server 130 has a memory containing other software modules, and server 130 is connected to a plurality of other clients 180, 181 and also to a production client 185. Production client 185 authors production images 190 shown on display 140 of personal computer 100 as well as providing a director module for one-time plug-in at client computer 100.

Figure 2A:
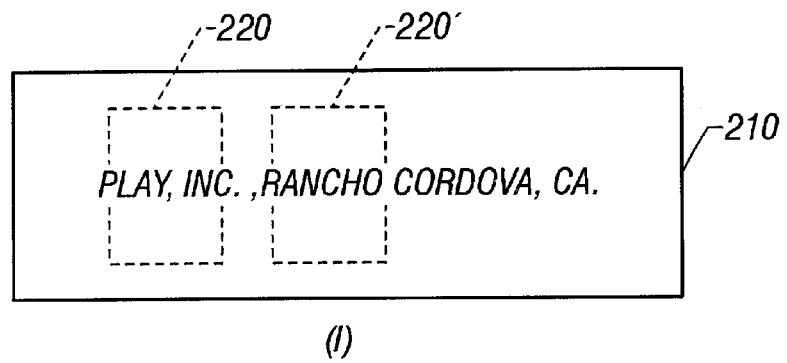
FIGS. 2(a)(i)–(iii) show a first move of a bit-mapped image.
Figure 2A:
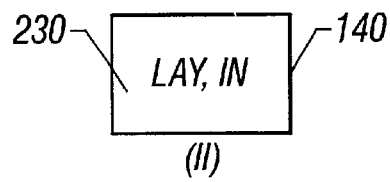
Figure 2A:
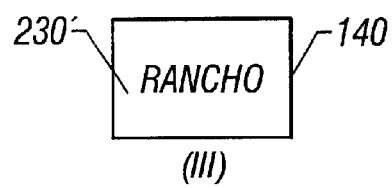

FIGS. 2(a) to 2(d) show selected "moves" characteristic of the low bandwidth television of the present invention. FIG. 2(a) shows a flying video plane. A still picture 210 of an image to be displayed on computer screen 140 resides in the personal computer (FIG. 2(a)(i)). Images 230, 230' of picture 210 are displayed on personal computer 100 such that not all of picture 210 fits within a display window 220, 220', but part of the picture 210 is cropped on the computer screen 140 as images 230, 230' (FIGS. 2(a)(ii)–(iii)). Now, picture 210 is rapidly translated within the display window 220, 220' of computer screen 140. Since the entire still picture 210 is already stored within the personal computer 100 as a bit-mapped image, there is no need to download a succession of images from a network or disk to give the illusion of motion. Moving images 230, 230' are created at the client personal computer 100 from the bit-mapped still picture 210 stored in the computer memory. One application is a pan around of a three hundred and sixty degree scene. Once the scene is stored as a bit-mapped still picture 210 in the computer, the director uses the script accompanying the still three hundred and sixty degree picture 210 to simulate a camera track at any position around the scene.

Another application is a moving banner. The banner is stored as a bit-mapped still picture 210 (FIG. 2(a)(i)), but picture 210 is cropped such that only one segment of the banner is displayed at one time (FIGS. 2(a)(ii)–(iii)). The script accompanying the banner is used by the director module to move the banner from left to right across screen 140, or up, down or diagonally across screen 140. Images 230, 230' appear to move much more rapidly and smoothly across screen 140 than in prior art systems because the processor of computer 100 is locally working on resident picture 210 to create images 230, 230' and a series of bit-mapped pictures 210 need not be continuously downloaded from a network.

Figure 2B:
FIGS. 2(b)(i)–(iv) show a second move of a bit-mapped image.
Figure 2B:
Figure 2B:
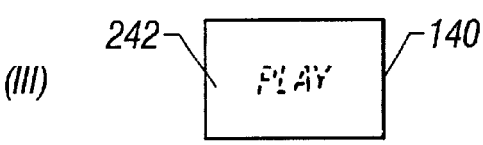
Figure 2B:
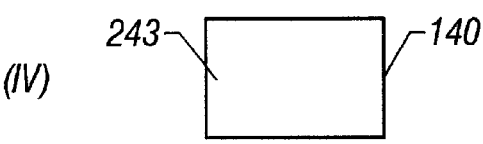

FIG. 2(b) shows a focus/defocus move. A bit-mapped still picture 240 resides in personal computer 100 along with a script module. Assume initially that the image is in focus and displayed on computer screen 140 as picture 240 (FIG. 2(b)(i)). The script cues the director to activate an algorithm residing on the personal computer 100 which calculates and displays a series of defocused images 241, 242, 243 of the original bit-mapped still picture 240 (FIGS. 2(b)(ii)–(iv)). This algorithm is one of the utilities downloaded on a one-time basis with the director and is optimized to produce rapid calculation of the defocused images. Picture 240 optionally is downloaded as a pair of pictures 240a and 240b, with picture 240a (FIG. 2(b)(i)) represented the focused or starting image and picture 240b (FIG. 2(b)(iv)) represented the defocused or target image. Preferably, the defocusing algorithm involves an optimized table representing iteratively defocused image states between the starting image and the target image. The script may indicate that the image is initially displayed as a defocused image and subsequently brought into focus, or vice versa.

FIGS. 2(b)(i)–(iv) also can be used to illustrate a dissolve. Picture 240 is sent with the script module including a dissolve code. The director contains an algorithm for executing this dissolve, preferably using optimized tables. The director thus tells computer 100 how to locally calculate dissolving images 240, 241, 242, 243 at client computer 100, and these images 240, 241, 242, 243 are continuously and rapidly displayed on screen 140.

Figure 2C:
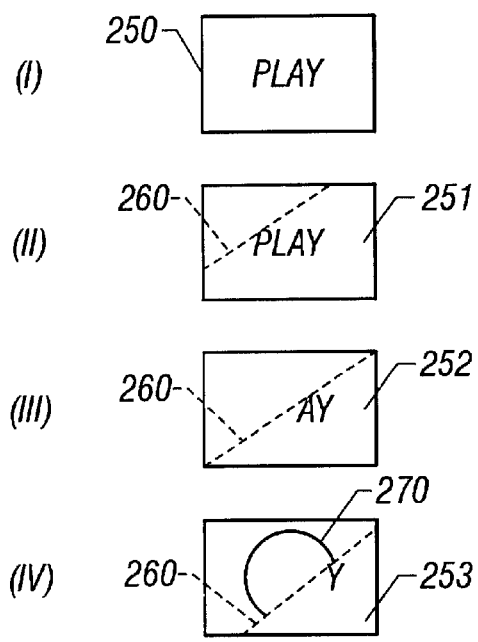
FIGS. 2(c)(i)–(iv) show a third move of a bit-mapped image.

FIGS. 2(c)(i)–(iv) show consecutive stages in a linear wipe. During a wipe, picture 250 is made to disappear from display screen 140 across a moving line 260. Line 260 may be horizontal, vertical, diagonal, straight or curved. As line 260 moves from one side or corner of picture 250 displayed on the computer screen 140 to the other side, picture 240 disappears from one side of the line 260 but remains on the other side (FIGS. 2(c)(ii)–(iv)). Thus, picture 240 is "wiped out" or removed as line 260 moves across screen 140, and images 251, 252, 253 are calculated by computer 100 with an algorithm found in the director. Wipe line 260 may also start from some place in the center of picture 240 and process outwards, or several wipe lines 260 may remove areas of picture 240 simultaneously starting from different places on picture 240. The kind of wipe that is to be executed by the director is indicated by the script code accompanying picture 240, and the processor of computer 100 locally calculates the wipe with algorithms found in the director. As the wipe line traverses across the image, a screen optionally is revealed to have a particular background 270 (FIG. 2(c)(iv)). Background 270 may be another bit-mapped image such as a photograph, text or graphic, or the background may be a solid.

Figure 2D:
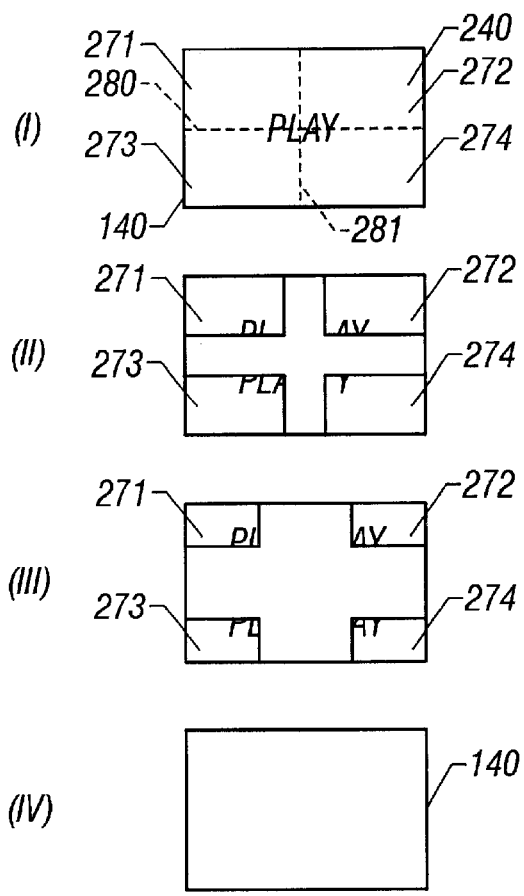
FIGS. 2(d)(i)–(iv) show a fourth move of a bit-mapped image.

FIG. 2(d) shows a biaxial wipe. Pieces 271, 272, 273, 274 of a bit-mapped picture 240 appear to split apart, and each piece 271, 272, 273, 274 moves in a different direction towards the edges of the display screen 140 (FIG. 2(d)(i)–(iv)). One example splits picture 240 along horizontal and vertical axes 280, 281, with each piece 271, 272, 273, 274 moving towards a respective corner of the display screen 140. There also may be two pieces moving along a diagonal line towards opposite diagonal sides of the screen. Once the wipe begins, the absence of the image optionally reveals another bit-mapped image, a blank screen, a particular color or texture.

Low bandwidth television produces a sequence of moves on still bit-mapped images specified by an accompanying script. The production sequence can be rapidly and consecutively strobed and repeated in a particular order, or the sequence can be strobed and repeated in a different order. Repetition and looping of sequences implies that any production sequence has an arbitrarily long and potentially infinite duration. A production sequence may consist of combinations of still images, high resolution photographs, text graphics, high resolution text, and animated computer graphics. While the present embodiment contemplates that the director primarily operates on still images, short video clips residing as stock footage with the director module may optionally be utilized.

Low bandwidth television assumes full screen and real time display of images. In contrast to prior art systems where image size must be scaled and quality reduced to conserve bandwidth, the present invention improves the viewing experience by requiring that images cover the entire screen of the personal computer. Larger size and higher resolution pictures are possible because a majority of the production work is contemporaneously performed by the director at the client location rather than prior to network transmission. Real time display is achieved because the image and audio modules are transmitted quickly across the network due to their small bandwidth. The director further guarantees a real time experience by inserting stock footage, looping and stretching whenever image data is delayed due to network latency.

Each image module is generally synchronized with an audio track that is sent with the script. The audio track optionally includes music tracks, Foley effects, and voiceovers. An audio engine has a capability of mixing multiple audio tracks and adding special audio effects such as reverb and audio delays in real-time. The director module includes a high quality audio synthesizer having a file size of about 20 megabytes.

One major difference between the low bandwidth production system of the present invention and prior art video production systems is the degree to which a finished product is sent over a network or stored on a disk. Prior art Internet video devices (e.g. MPEG) send a finished product over the network, while the present invention sends only a partial product and a script and then finishes the video production at the client station with the director. Much greater bandwidth is required for the prior systems of sending a finished series of images over the network than it does to send a partially completed set of images with a script describing how the images are to be animated, and then finishing the animation of the images at the client computer. In a disk storage environment, much more disk space is required to store all of the pixels of a series of images than to store one image and script code representing how the images are to be animated.

Furthermore, the video production method of the present invention is much faster than prior art methods despite the reassembly time for still image production at the client. The speed of the prior art method of downloading video images from the Internet is limited by a bottleneck at the modem. By contrast, while the video production of the present invention is uncompleted at the time it arrives at the client computer, the processor reconstructs the production from the images and the script much more quickly than the delay occasioned at the modem.

LBTV has a number of advantageous characteristics. It uses the same audio and visual language of film and video production standards. Smooth and continuous motion is produced in real-time as compared to standard methods of viewing images from networks. There is no image latency because the image stills and script are transmitted rapidly in comparatively small files. Moving images are displayed in real-time because the director quickly calculates the production sequence at the client computer from the stills and script. The images are displayed at sixty fields per second (in NTSC) with anti-aliased graphics, high-resolution imagery, full-screen displays and high-quality audio. These capabilities are realized because the majority of the work is done by exploiting the processor and memory at the client computer.

Although digitized video clips may be used with LBTV, their large bandwidth implies that they are utilized sparingly. However, clip bandwidth can be decreased with keys to reduce their size, or with other special effects such as strobing or posterization. In strobing, every fifth video frame is displayed and frozen. Stock footage stored at the client computer may also be used since it requires no network transmission time.

The present invention also provides stand-in and loops to permit an immediate and continuous viewing experience without caching. Initially, only the script module and the earliest part of the image data from the image module are sent across the network. Thus, presentation of images and sound begins immediately for the viewer without downloading of the entire image file. Neither is it necessary for the image and sound data to cache in the client computer memory. To prevent latency problems, the director inserts stock footage as stand-ins or causes the images already received to loop or stretch in the production sequence.

Therefore, in contrast to prior art systems where the visual stream is interrupted or the viewer must wait while the images are downloaded, the director ensures a continuous viewing experience.

The present invention is also applicable to receiving a production module comprising a script module, an image module, and an audio module, from a disk drive, e.g. a CD-ROM, rather than obtaining this module over a network. While digital video disks (DVDs) provide for real time viewing at approximately sixty frames per second, low bandwidth production techniques further increase the number and run time of programs that can be stored on a single DVD. Moreover, LBTV does this without data compression.

Figure 3:
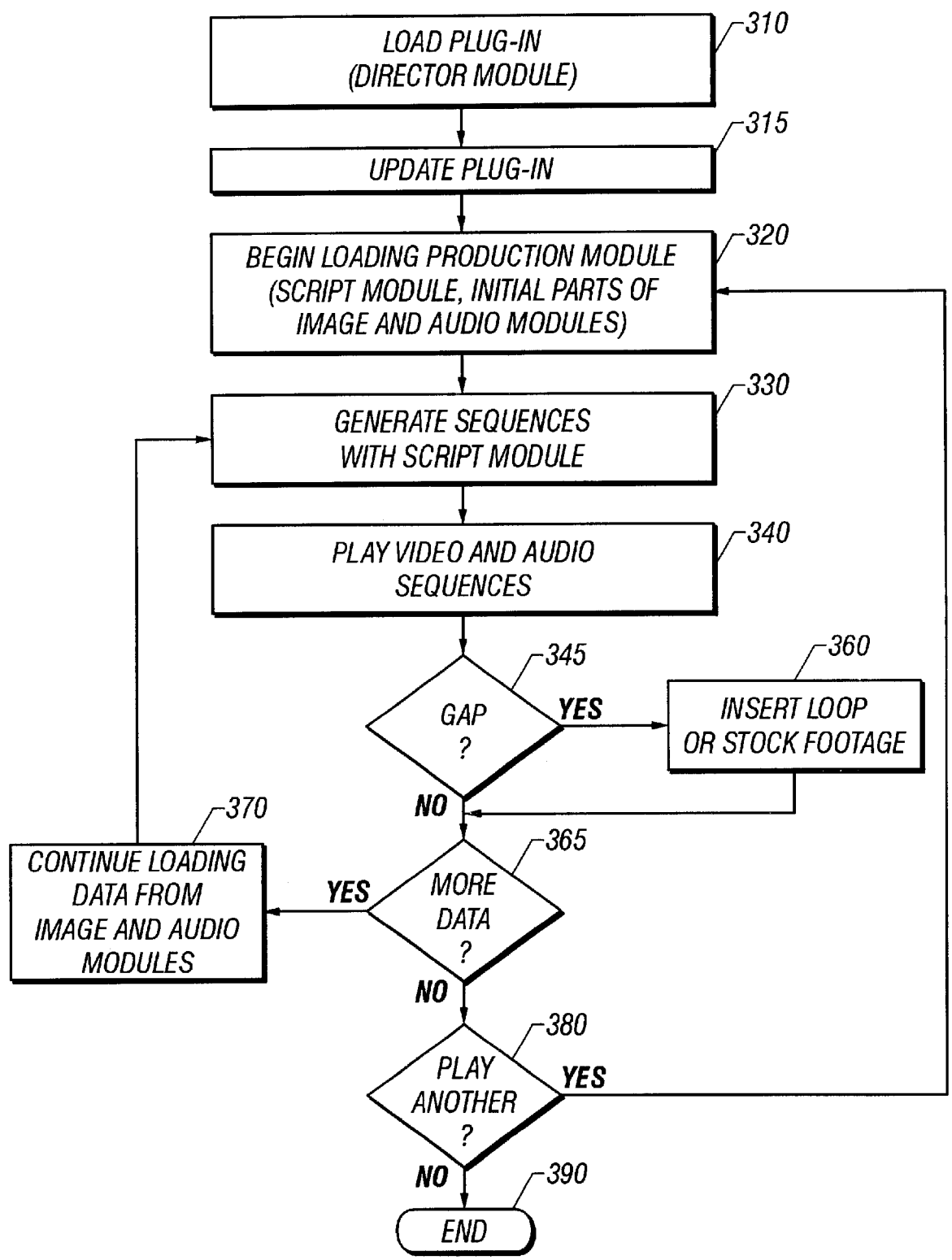
FIG. 3 illustrates a flowchart for playing back visual and audio sequences.

FIG. 3 is a flowchart of the steps in creating and viewing a low bandwidth television production. A user first loads a plug-in in step 310. The plug-in contains a director module including algorithms to perform all of the video "moves," as well as stock footage and other utilities. The loading is done on a one-time basis, although the plug-in may be updated periodically, e.g. when new algorithms are added to the director (step 315). The plug-in may be downloaded from a network server, or the plug-in may be uploaded from a disk drive, for example, a magnetic disk or a CD-ROM.

A particular video production begins in step 320. The production module includes an image module, an audio module and a script module. Initially, only the script module and first viewing parts of the image and audio modules are transmitted over the network so that viewing begins immediately without caching. Viewing is initiated either by clicking on a link in a web site and receiving transmitted data from a network (e.g. the Internet) via a server, or by reading from a disk drive, for example, a magnetic disk or a CD-ROM.

The director module uses the script module to generate initial video and audio sequences from the image module and the audio module (step 330). The video and audio sequences are played on the video screen and through stereo speakers of the personal computer (step 340). Meanwhile, more data from the image module and audio module are loaded across the network into the client computer (step 370). The director module continues to work on the newly received data from the image and audio modules with cues from the script module to generate new visual and audio sequences.

If there is a gap at any time in the production due to latency or data transfer problems (step 345), the director maintains a continuous real time presentation by inserting stock footage or providing looping (step 360). As long as there is more data being received from the network (step 365), the director continues to load data from the image and audio modules (step 370). When program data transmission is complete, a user may return to play another video and audio sequence (step 380), or terminate the program (step 390).

Figure 4B:
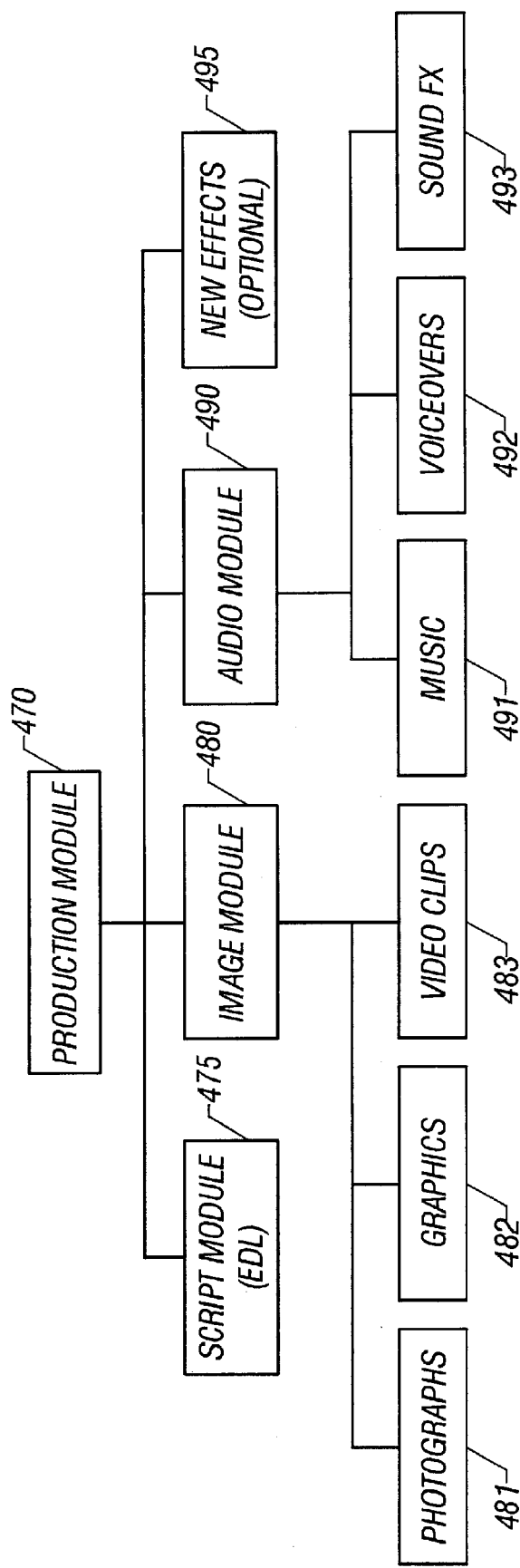
FIGS. 4(a) and (b) illustrate software modules for producing visual and audio sequences.

FIGS. 4(*a*) and (*b*) illustrate software components of the various modules of the present invention. The plug-in comprises director module 410, which includes full screen transition algorithms 420 and partial screen effects algorithms 430 (FIG. 4(*a*)). Examples of full screen transitions are moving bitmaps 421, wipes 422, and animation programs 423. Director 410 further comprises instrument sample libraries 440, stills 450, and stock footage 460. Stock footage 460 may include short video clips. Each of the modules is on the order of 20megabytes. Software algorithms of director module 410 are designated by Global Unique Identifiers (GUIs) to permit indexing of algorithms.

Production module 470 includes script module 475 with commands in an edit decision list (EDL), image module 480 having bit-mapped images of the still pictures utilized in the production, including photographs 481, graphic images 482, and short video clips 483 (FIG. 4(*b*)). Audio module 490 includes music score 491, voiceovers 492 and sound effects 493. Production module 470 further includes optional new effects 495, which may be identified as needed for a specific production module 470. New effects software algorithms 495 are identified by the edit decision list of script module 480 via respective GUIs to determine whether algorithms 495 are already present in director module 410.

Figure 5:
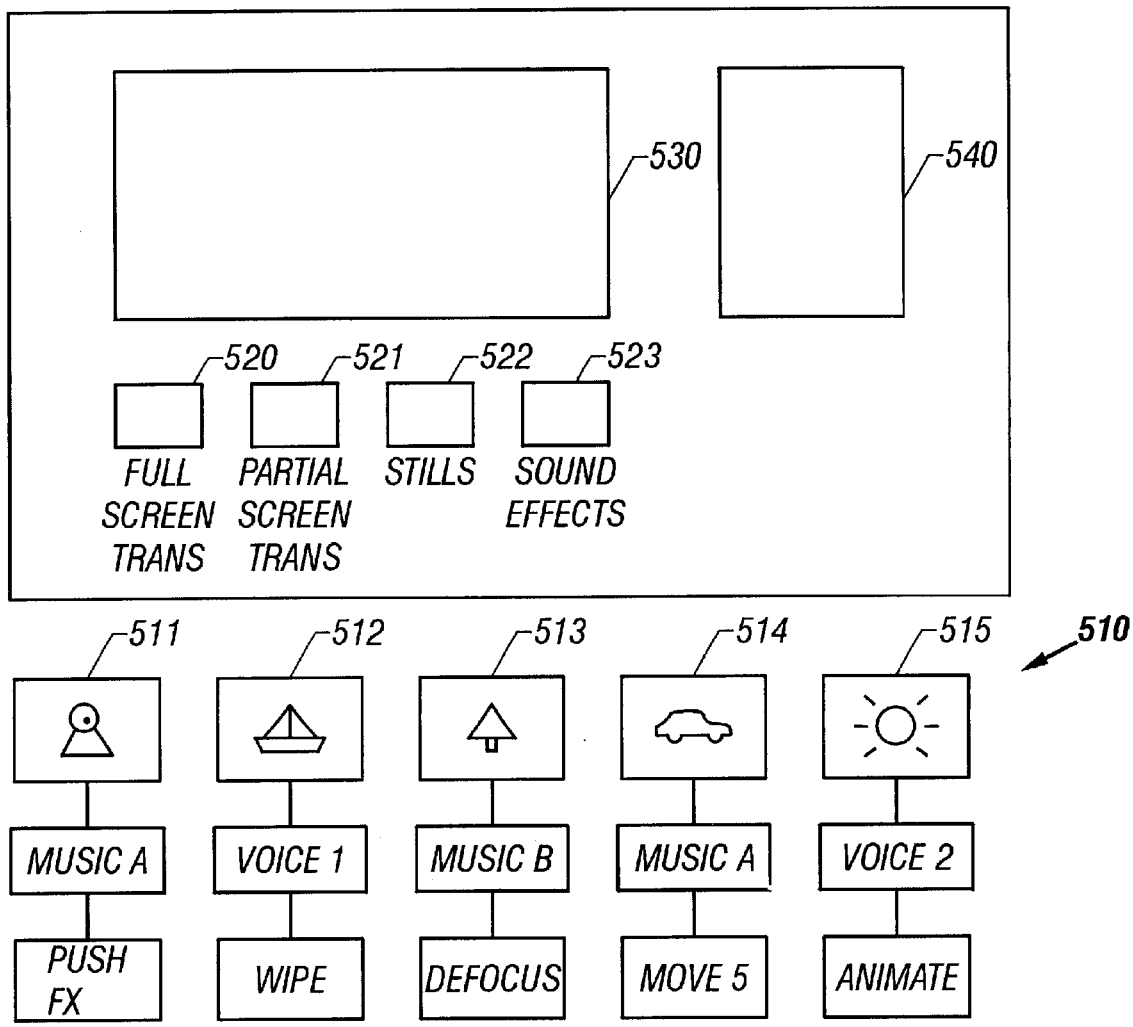
FIG. 5 shows a user interface for authoring visual and audio sequences.

FIG. 5 illustrates a User Interface (UI) for an authoring tool to create production modules 470 as a series of pages 510. A user first specifies page 511 corresponding to a first in a series of effects in a sequence. Button bars 520, 521, 522, 523 are selected to edit pages 510. EDL commands are attached to page 511 by clicking on button bars 520–523 to create script module 480. Bit-mapped still image files are attached to page 511 to form image module 490, and sound effects files are attached to page 511 to make audio module 480. Preview window 530 displays still bitmapped images, and a list of file names for image, audio and script (EDL) files is displayed in preview window 540. Once a bitmapped image, audio file, and edit decision list are associated with page 511, the process is repeated for pages 512, 513, 514, etc. Production module 470 is complete once all of pages 510 are created and assembled. A production editor can then go back and re-edit any of the pages.

A completed production module 470 is stored on server 130 as a disk file(s), and client computer 100 contacts server 130 when a viewer desires to watch the program. Client-side production may begin immediately upon sending the EDL with some initial program content, and client computer 100 performs production on-the-fly. Additional content not yet present at client 100 is transmitted in temporal order. Even if a given section of the program occurs before all of the required content has been transferred, the playback engine ensures continuity using stand-ins such as line drawings and looped sequences.

Although the present invention has been described in its preferred embodiments, those skilled in the art will appreciate that alternate embodiments, not specifically described herein, may be deduced without departing from the spirit and scope of the invention, which is limited only by the following claims.

We claim:

1. A low bandwidth video system, comprising:
   a computer having a display screen and a memory;
   a director module residing in said memory; and
   a script module, an image module, and an audio module;
   wherein said director module
     uses said image module and instructions in said script module to compute a series Of real-time screen transitions; and
     combines said real-time screen transitions with associated audio to render a high quality digital video on said display screen.

2. The system of claim 1, wherein said director module is downloaded or uploaded on a one-time basis.

3. The system of claim 2, wherein said director module is periodically updated, as needed.

4. The system of claim 2, wherein said director module is downloaded from a network.

5. The system of claim 2, wherein said director module is uploaded from a fixed medium or alternate memory.

6. The system of claim 1, wherein said director module ensures real-time dynamics of said digital video by inserting stock footage or loops.

7. The system of claim 1, wherein said image module contains bit-mapped still images.

8. The system of claim 7, wherein said image module further contains short video clips.

9. The system of claim 1, wherein said audio module contains music and voiceovers.

10. The system of claim 1, wherein said image module and said audio module are transmitted over a network to said computer.

11. The system of claim 1, wherein said image module and said audio module are read from a fixed medium or alternate memory.

12. The system of claim 1, wherein said screen transitions include a wipe.

13. The system of claim 1, wherein said screen transitions include a focus or defocus.

14. The system of claim 1, wherein said screen transitions include a fade.

15. The system of claim 1, wherein said screen transitions include a dissolve.

16. The system of claim 1, wherein said screen transitions include a translation of images and said images are cropped so that only a portion of said images are visible as a new piece of said images moves across said display screen.

17. The system of claim 1, wherein said digital video is initiated by sending only said script module and preliminary pieces of said image module and said audio module, and said director module continues to receive pieces of said image module and said audio module as said digital video is playing.

18. The video system of claim 1, wherein said director module comprises screen transition algorithms which are executed pursuant to the instructions, found in said script module, to compute said real-time screen transitions.

19. The video system of claim 18, further comprising a new effects module including new effects algorithms;

wherein said director module will execute said new effects alorithms per the instructions, found in said director module, to compute said real-time screen transitions.

20. A method of rendering low bandwidth video, comprising the steps of:

receiving an image module, an audio module and a script module at a computer;

allowing a director module to use said image module and instructions in said script module to compute a series of real-time screen transitions; and allowing said director module to combine said real-time screen transitions with associated audio to render a high quality digital video on a display screen of said computer.

21. The method of claim 20, wherein said receiving step comprises receiving said image module, said audio module and said script module from a network.

22. The method of claim 20, wherein said receiving step comprises receiving said image module, said audio module and said script module from a fixed medium or alternate memory.

23. The method of claim 20, further comprising the step of:

loading said director module, on a one-time basis, into said computer.

24. The method of claim 20, further comprising the step of:

periodically updating said director module, as needed.

25. The method of claim 20, further comprising the step of:

adding stock material or looping segments into said digital video to eliminate gaps in said digital video and to ensure real-time continuity.

26. The method of claim 20, further comprising the step of:

initiating said digital video by sending only said script module and preliminary pieces of said image module and said audio module, with said director module continuing to receive pieces of said image module and said audio module as said digital video is playing.

27. A computer readable medium comprising program instructions for displaying low bandwidth video images by performing the steps of:

receiving an image module, an audio module and a script module;

allowing a director module to use said image module and instructions in said script module to compute a series of real-time screen transitions; and allowing said director module to combine said real-time screen transitions with associated audio to render a high quality digital video on a display screen of said computer.

* * * * *